United States Patent
Honeycutt et al.

(10) Patent No.: US 9,771,220 B1
(45) Date of Patent: Sep. 26, 2017

(54) CONVEYOR BELT WITH SIDEWALLS

(71) Applicant: Intralox, L.L.C., Harahan, LA (US)

(72) Inventors: James Honeycutt, Grandville, MI (US);
Edward T. Mol, Marne, MI (US);
Daniel Hendrickson, Cedar Springs, MI (US)

(73) Assignee: Intralox, L.L.C., Harahan, LA (US)

(*) Notice: Subject to any disclaimer, the term of this patent is extended or adjusted under 35 U.S.C. 154(b) by 0 days.

(21) Appl. No.: 15/177,960

(22) Filed: Jun. 9, 2016

(51) Int. Cl.
*B65G 15/40* (2006.01)
*B65G 15/42* (2006.01)
*B65G 15/44* (2006.01)

(52) U.S. Cl.
CPC ............. *B65G 15/40* (2013.01); *B65G 15/44* (2013.01)

(58) Field of Classification Search
CPC ......... B65G 15/42; B65G 15/44; B65G 15/46
USPC ................... 198/844.1, 698, 699.1, 820, 821
See application file for complete search history.

(56) References Cited

U.S. PATENT DOCUMENTS

| | | | | | |
|---|---|---|---|---|---|
| 2,864,488 | A * | 12/1958 | Taipale | ............... | B65G 15/42 198/821 |
| 4,109,784 | A * | 8/1978 | Hartmann | ............ | B65G 15/42 198/821 |
| 4,832,183 | A * | 5/1989 | Lapeyre | ............. | B65G 17/08 198/690.2 |
| 6,170,646 | B1 * | 1/2001 | Kaeb | .................. | B65G 15/08 198/819 |
| 6,360,878 | B1 * | 3/2002 | Deal | ................... | B65G 15/08 198/311 |
| 6,811,021 | B1 * | 11/2004 | Corley | .............. | B65G 17/086 198/690.2 |
| 7,690,499 | B2 * | 4/2010 | Smith | ................. | B65G 15/08 198/690.2 |
| 8,827,070 | B2 * | 9/2014 | Kalverkamp | ....... | A01D 17/10 198/690.2 |
| 2002/0139643 | A1 * | 10/2002 | Peltier | ............... | B65G 15/08 198/821 |
| 2005/0167249 | A1 * | 8/2005 | Rundqvist | ......... | B65G 17/086 198/844.1 |
| 2005/0217973 | A1 * | 10/2005 | Bjorklund | ........... | B65G 15/08 198/369.3 |
| 2013/0140143 | A1 * | 6/2013 | De Bruijne | ....... | B23K 26/0838 198/689.1 |
| 2015/0284185 | A1 * | 10/2015 | Schroeder | .......... | B65G 15/08 198/617 |
| 2016/0031650 | A1 | 2/2016 | Petersen et al. | | |

FOREIGN PATENT DOCUMENTS

| | | |
|---|---|---|
| EP | 1524211 A1 | 4/2005 |
| JP | 05-001713 U | 1/1993 |
| WO | 2009112312 A1 | 9/2009 |

* cited by examiner

*Primary Examiner* — James R Bidwell
(74) *Attorney, Agent, or Firm* — McGarry Bair PC

(57) ABSTRACT

An endless conveyor belt comprises a flat belt with sidewalls. Each sidewall has slots spaced at regular intervals, and disposed at an acute angle relative to the facing surface of the sidewall, so that the belt can make a reverse bend with minimal obstruction. The sidewall may have overlapping sections in an alternate embodiment.

20 Claims, 15 Drawing Sheets

CONVEYOR BELT WITH SIDEWALLS

BACKGROUND OF THE INVENTION

Field of the Invention

The invention relates to endless belts for conveyors and, more particularly, to an endless belt having at least one sidewall.

Description of the Related Art

The use of thermoplastic belts in conveyors is known. Generally they are of two general configurations: flat or toothed. Flat belts are generally friction driven, and toothed belts are driven by pulleys or sprockets.

Particularly in the food industry, it is known to add sidewalls to a flat belt. Sidewalls are typically walls that extend normally relative to the belt surface to assist in retaining loads on the belt. Usually there are two walls extending longitudinally on the belt spaced from each other, so that loads can be accommodated between them. To accommodate wrapping the belt over a pulley or a nose bar, the sidewalls are either slotted or corrugated. An exemplary prior art belt 1 with a corrugated sidewall is illustrated in FIG. 1 where a body portion 2 of the belt is wrapping a pulley 4. The body portion comprises a load surface 6 and a drive surface 7. Sidewalls 8 extend from the load surface 6 and are corrugated, meaning that each is folded and shaped in an accordion-like fashion. When the body portion 2 wraps or bends around a portion of the pulley 4 in a conventional manner to be driven by frictional engagement of the pulley 4 and the drive surface 7, an upper portion of the corrugated sidewall 8 unfolds to accommodate the bend.

Limitations and problems exist in known belts with corrugated sidewalls. For example, a reverse bend, where the load surface wraps or bends around a pulley, is difficult to accommodate to a small radius with corrugated sidewalls because the height of the sidewalls tends to influence the radius of a reverse bend. The higher the sidewalls, the larger the radius that is required in order to effectively wrap a pulley. Another problem with corrugated sidewalls is that they are hard to clean because the contents on the conveyor belt may become trapped within the folds. Also, the tops of the folds tend to wear more in reverse bends, especially with smaller bend radius. As well, some effectiveness is lost in scraping a belt because the scraper must accommodate the folds and motion of corrugated sidewalls. Further, corrugated sidewalls tend to have a larger footprint on the surface of the belt, thereby requiring a wider belt to accommodate the load. They add significant weight to the belt making it difficult to handle and requiring more energy to operate.

An exemplary prior art belt 10 with a non-corrugated sidewall is illustrated in FIGS. 2 and 3 comprising a body portion 11, a load surface 12, and a drive surface 14. Sidewalls 30 extend from the load surface 12 and comprise a number of slots 32, spaced from each other at regular intervals. Each slot 32 extends from a top edge 33 of the sidewall 30 to a point 34 just above the junction of the sidewall with the load surface 12. When the body portion 11 wraps or bends around a portion of the pulley 40 in a conventional manner to be driven by frictional engagement of the pulley 40 and the drive surface 14, as show in FIG. 3, an upper portion of the sidewall 30 separates at the slots 32 to facilitate the bend. In this configuration, a span of the body portion 11 between the pulleys 40 will carry loads on the load surface 12 as the endless belt 10 travels in the direction indicated by arrow 46. The slots 32 in the sidewalls 30 enable the sidewalls to remain generally normal relative to the load surface 12 as the body portion 11 wraps or bends around a pulley 40.

But limitations and problems also exist in known belts with non-corrugated sidewalls. For example, the edges of the upper portion of the sidewall adjacent to each slot tend to butt each other, instead of sliding past each other in a reverse bend. Also, the "root" of the slot (34) is susceptible to "crack propagation" if not designed properly due to the opening and closing motion of the slots 32 during a bend. The angle of the slot 32 does not promote "self-cleaning" and will harbor food stuffs, since the slot 32 is cut normal to the sidewall, i.e.: at an angle of 90 degrees.

SUMMARY OF THE INVENTION

The invention solves the aforementioned problems by providing a conveyor belt having a body portion with a load surface and a non-corrugated sidewall extending from the load surface of the body portion. The sidewall also has a longitudinal surface with slots extending through it at an acute angle relative to the longitudinal surface. This structure facilitates a reverse bend of the body portion about an axis.

Preferably, each slot is defined by a leading slot surface and a trailing slot surface, relative to the direction of travel of the belt, and the acute angle is measured between the trailing slot surface and the adjoining longitudinal surface. The leading slot surface and the trailing slot surface can be separated by a kerf. Each slot preferably extends from a distal edge of the sidewall to a point spaced from the load surface and the proximal edge of the sidewall with a hole or stress relief feature disposed at the point to minimize migration of the slot past the end point.

Alternatively, the sidewall can have a foot at the proximal edge, or it can taper in thickness from the proximal edge to the distal edge. Materials or techniques can be used to reduce friction between the leading slot surface and the trailing slot surface. One embodiment of such means can include a smaller acute angle. Another embodiment can include a lower coefficient of friction at the leading slot surface and the trailing slot surface. The acute angle allows for an increase in the "kerf" dimension, reducing contact between adjacent surfaces during a reverse bend, without degrading the carrying capability. A kerf size can also be selected which promotes a "self-cleaning" action as the sidewall collapses on itself during each cycle of the belt, assisting pushing over the adjacent section and removing food stuff from the kerf.

In another aspect of the invention, a second sidewall can be disposed immediately adjacent to the sidewall, having slots staggered relative to the slots in the sidewall to prevent any binding action during belt movement.

In another embodiment of the invention, the slots have a U-shaped cut at the proximal edge of the sidewall slot for an alternate embodiment of the stress release feature. This also provides the sidewall with flexibility to overlap during a reverse bend to provide a smaller radius bend.

In another embodiment of the invention, the sidewall comprises a plurality of angled segments which overlap each adjacent segment in the row at all times. This increases the stability of the sidewall and allows for the sidewall to bend over a smaller radius than previous conveyers with sidewalls, especially in reverse bend, since the segments will have less resistance or butting action between each adjacent segment. The elimination of gaps between segments also prohibits food stuffs from becoming wedged in the slots.

In yet another embodiment of the invention, the cleat comprises a plurality of angled segments which overlap each adjacent segment in the row at all times. This allows for the cleat to bend and engage in a reverse bend, as opposed to a rigid cleat. The absence of gaps between segments also prohibits food stuffs from becoming wedged in the slots.

DETAILED DESCRIPTION OF THE DRAWINGS

Figure 4:
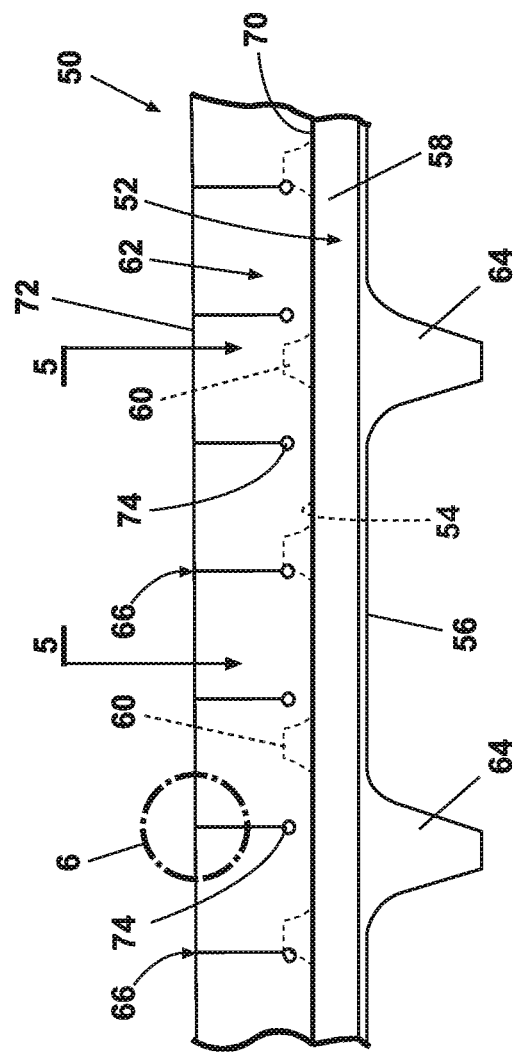
FIG. 4 is a side view of the portion of an endless toothed belt according to an aspect of the invention.

Referring again to the drawings, FIG. 4 illustrates an embodiment of an endless thermoplastic conveyor belt 50 according to one aspect of the invention. The belt 50, which is typically made of a thermoplastic material such as Pebax® resin, polyester, or polyurethane, comprises a body portion 52 having a load surface 54, and a pulley surface 56. Further, the body portion 52 has two side edges 58. Cleats 60 may protrude from the load surface 54 in this embodiment as a feature for product handling. In other embodiments, the load surface 54 can be fairly smooth and free of discontinuities, or it can contain other features. For example, the body portion 52 may be devoid of cleats, or it may have visible indicia on the load surface 54.

Figure 1:
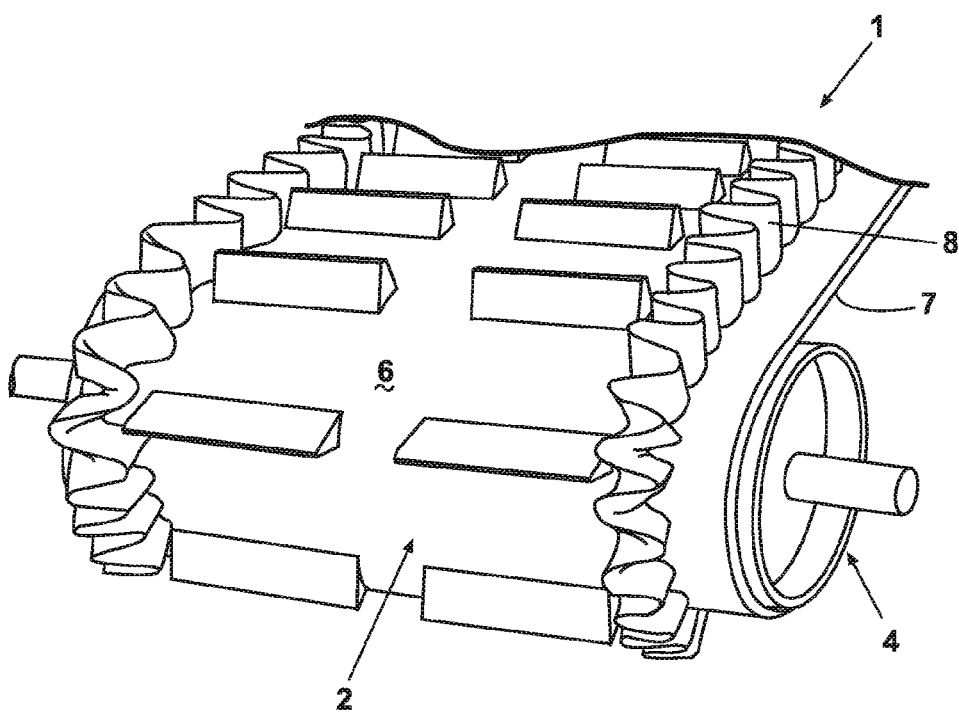
FIG. 1 shows a prior art conveyor belt with corrugated sidewalls.
Figure 2:
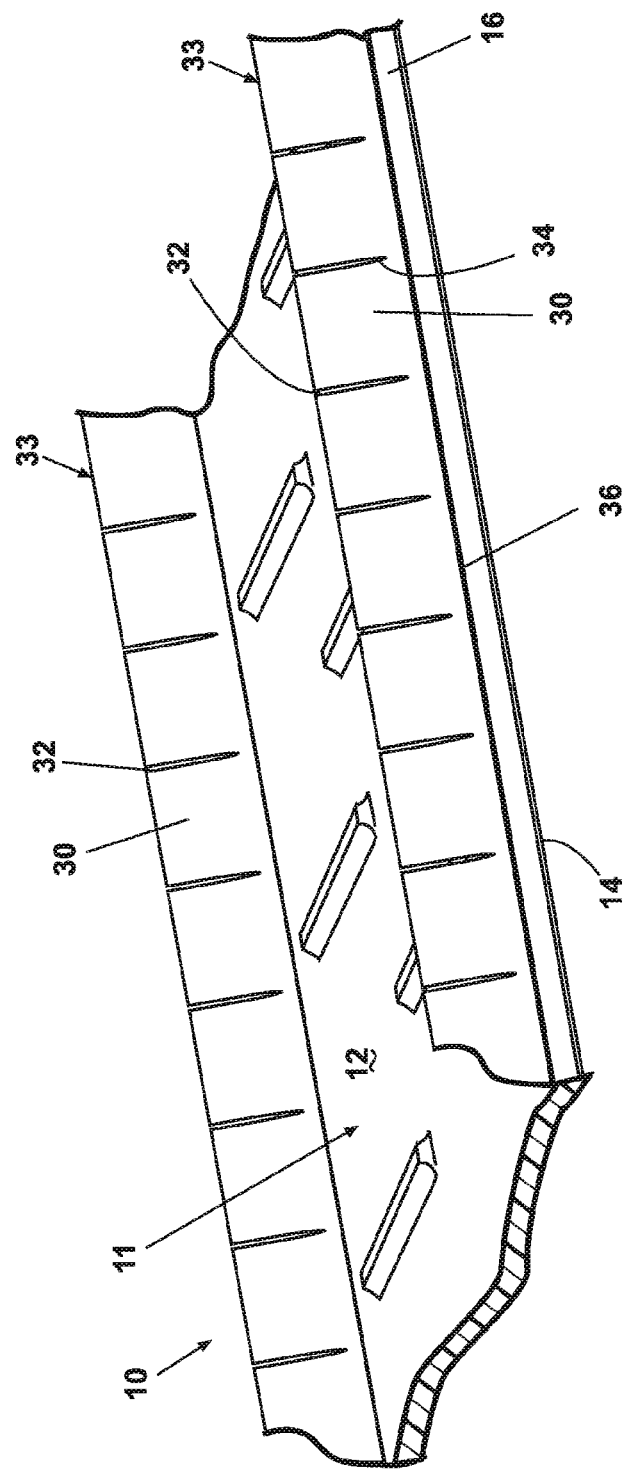
FIG. 2 shows an isometric view of a portion of a prior art conveyor belt with non-corrugated sidewalls.
Figure 3:
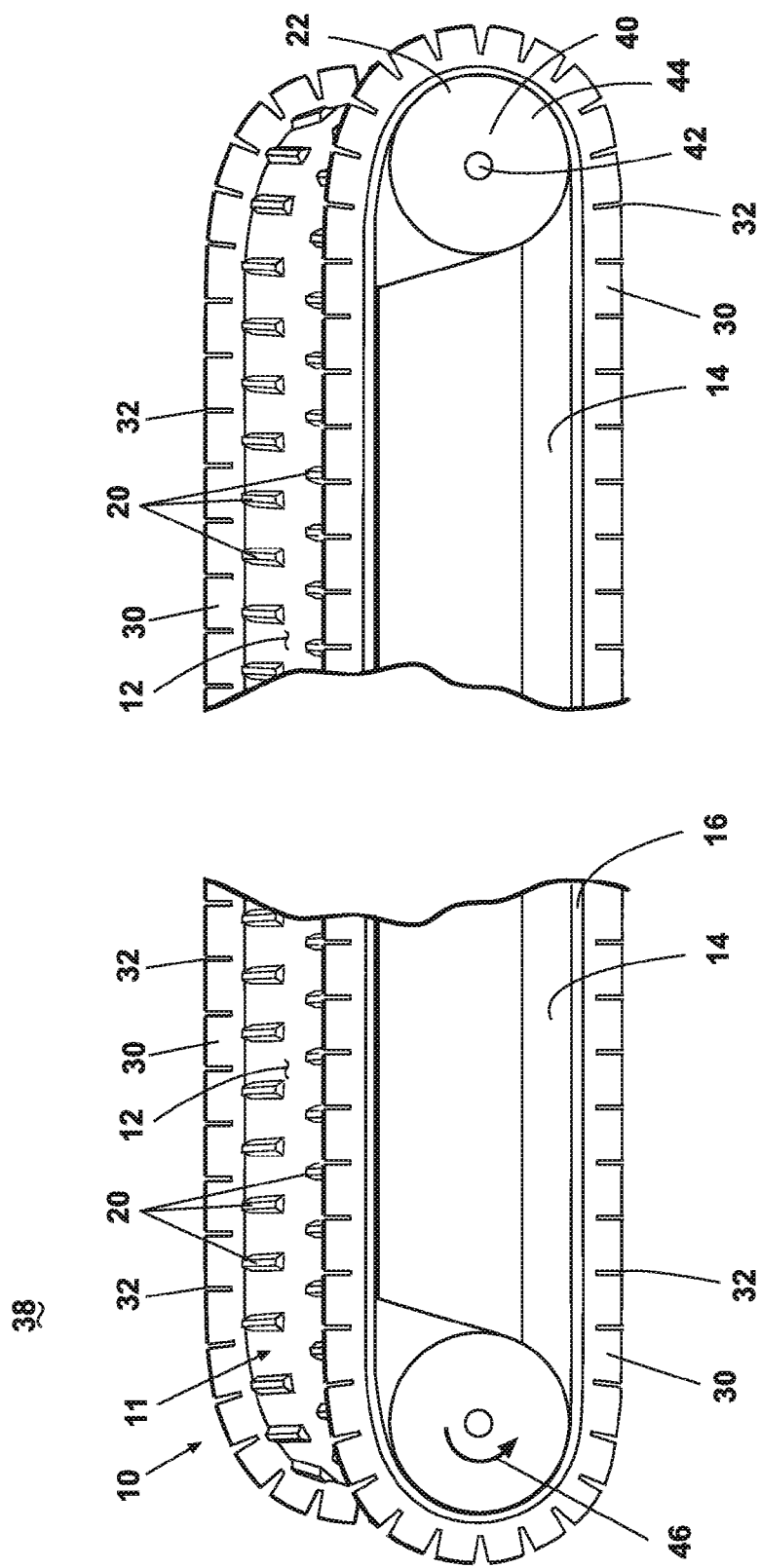
FIG. 3 is an isometric view of the portion of the prior art endless belt of FIG. 2 installed between two sets of pulleys to form a conveyor.
Figure 5:
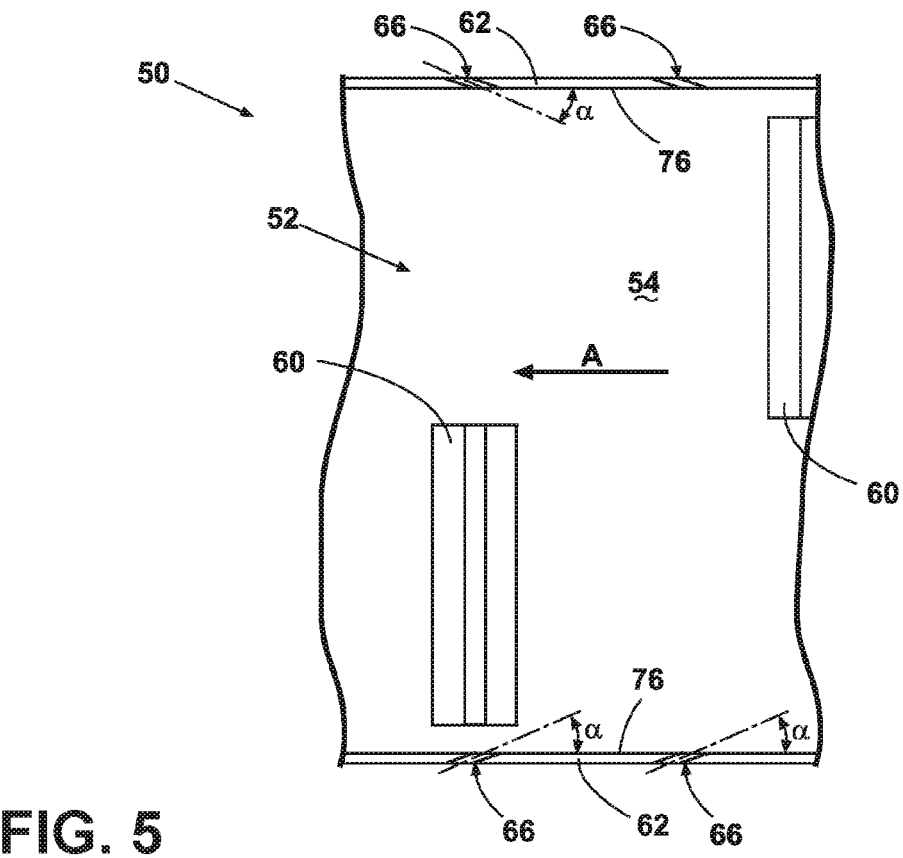
FIG. 5 is a sectional view taken along line 5-5 of FIG. 4.

FIG. 5 illustrates the body portion 52, which comprises a sidewall 62 extending from each of the side edges 58 of the load surface 54, generally normal relative to the load surface. It will be understood that the sidewalls 62 are not limited to extending from the side edges 58. In other words, they can be spaced inwardly from the side edges as desired. Also, it will be understood that a belt according the invention is not limited to a particular drive mechanism. In other words, the belt 50 can be a flat belt similar to that illustrated in FIGS. 1-3, or it can be a toothed belt as shown in FIG. 4. In this respect, the belt 50 further comprises a plurality of teeth 64 spaced from each other on the pulley surface 56.

Slots 66 are located in the sidewalls 62 to enable the body portion 52 to wrap or bend around a drive pulley in both directions. The sidewalls 62 can be formed separately and later affixed to the body portion 52, or they can be made integrally with the body portion 52 as by extrusion. If the sidewalls 62 are formed separately and later affixed to the body portion 52, the body portion 52 and the sidewalls 62 can be made of dissimilar materials. For example, the sidewalls 62 can be made of a harder material, such as polyurethane, than the body portion 52. With straight sidewalls 62, less material is needed than would otherwise be required to make corrugated sidewalls. As well, the sidewalls may be made higher than conventional corrugated sidewalls due to the decreased weight of the sidewall 62 in comparison to corrugated sidewalls. For example, the sidewalls 62 can be made of a three inch high strip of polyurethane that is four millimeters thick. Consequently, a sidewall 62 can be welded to the load surface 54 or to the side edge 58 of the body portion 52 with a technique such as laser welding, or RF welding, or hot air welding. This would be particularly beneficial if a transparent or semi-transparent material such as a clear polyurethane is used for the sidewalls 62. The sidewalls 62 can also be co-extruded or cold welded. The sidewalls can also have a "surface texture" designed to enhance product release or conveyance during a bend and in general product movement.

It is believed that the sidewalls can preferably be made up to about 7 mm thick. The higher the sidewalls 62, the thicker the sidewall 62 must be in order to remain standing upright through bends. In some cases a sidewall 62 can be tapered, being thicker at its proximal edge 70 where it joins the load surface 54 and thinner at the distal or top edge 72. As well, a foot can be added at the junction of a sidewall and the load surface to help stabilize and strengthen the sidewall.

The slots 66 are spaced from each other at a distance that will enable the belt 50 to wrap or bend around a pulley without losing the structural integrity of the sidewall. Thus, for the belt 50 to bend around a narrow diameter pulley, they will have be spaced closer to each other than if the belt were to wrap a larger diameter pulley, as can be seen in FIG. 8.

In the illustrated embodiment of FIG. 4, the slots 66 are located approximately every inch to accommodate wrapping around a pulley 6.5 inches in diameter or larger. Also, in this embodiment, each slot 66 extends normally relative to the load surface 54, from the distal edge 72 of each sidewall 62 to a slot extension such as a hole 74 spaced from the junction of the sidewall 62 with the load surface 54. The slots 66 can be formed with or without a kerf, preferably with little or no kerf. The holes 74 prevent the slots 66 from migrating the entire height of the sidewalls 62 to the attachment surface and thus, preferably, have a diameter greater than the kerf of each slot, if any. The holes 74 also provide stress reduction compared to a knife edge end of a slot 66 as illustrated in the prior art, FIG. 2, where the slot may encourage cracking and thus crack propagation throughout the sidewall 62. For example, with slots having no kerf or a kerf less than ⅛ inch wide, ⅛ inch diameter holes 74 can be located ¼ of an inch away from the junction of the sidewall 62 with the load surface 54.

In this embodiment, a sidewall 62 extends from each side edge 58. However, it is within the scope of the invention for one or more sidewalls 62 to extend from any portion of the load surface 54. For example, a single sidewall 62 could extend from the middle of the load surface 54, dividing the load surface longitudinally. As well, three sidewalls 62 can be disposed on the load surface 54, creating two adjacent lanes on the body portion 52 of the belt. Further, the sidewalls 62 need not necessarily be continuous longitudinally. They may be discontinuous for a specific application.

Figure 6:
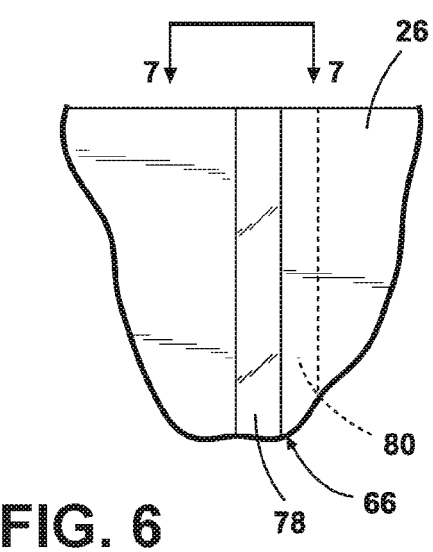
FIG. 6 is an enlarged view of the portion of FIG. 4 labeled 6.
Figure 7:
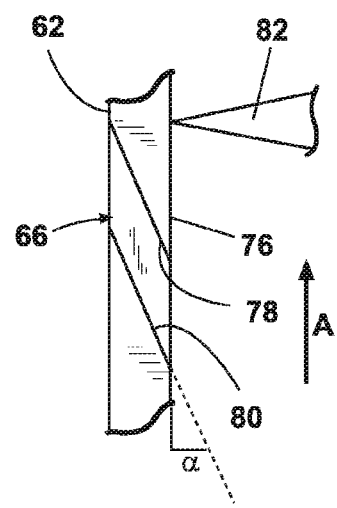
FIG. 7 is a sectional view taken along line 7-7 of FIG. 6.
Figure 8:
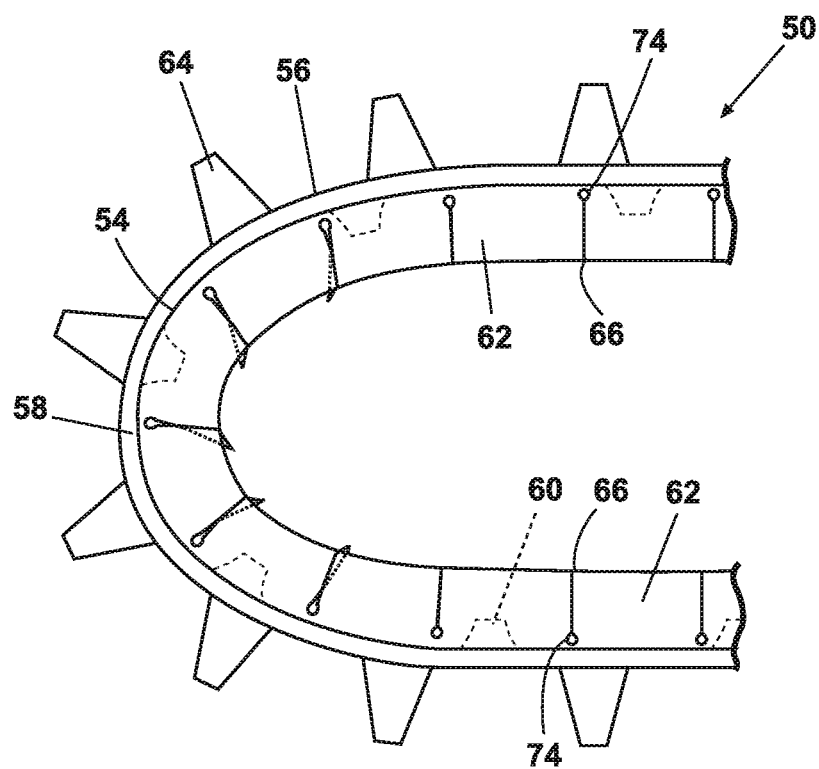
FIG. 8 is a side view of a portion of the endless belt in the embodiment of FIG. 4 engaged in a reverse bend.

Looking now also at FIGS. 6-8, it can be seen that the slots 66 extend through the sidewall 62 at an acute angle α relative to the longitudinal direction of the sidewall 62 and the belt 50. Thus, as viewed from the side, there may be no visible space at each slot 66, regardless of the existence of any kerf (see FIG. 6). More detail of the slots 66 can be seen in FIGS. 6-7. The angle α is preferably acute relative to an inside facing surface 76 of the sidewall 62. Each slot 66 is thus defined by opposing slot surfaces 78, 80, each of which is disposed at the angle α relative to its adjoining inside facing surface 76. Preferably, the slots 66 are disposed so that the angle α relative to the inside facing surface 76 faces away from the direction of travel of the belt (shown by the arrow A in FIG. 5) to prevent food stuffs from being caught in the sidewall 62. Thus, one slot surface 78 will normally be leading and the other slot surface 80 will normally be trailing. Consequently, the facing surface 76 can be scraped by a scraper 82 with minimal obstruction caused by each slot 66. If a scraper were to be scraping a facing surface 76 when the slot 66 approached, the scraper blade would easily pass the slot by contact with the trailing slot surface 80 and transition easily to the adjoining inside facing surface 76.

However, the biggest advantage of the angled slots 66 is that adjacent segments of the sidewall 62 can easily slip past each other during a reverse bend, as shown in FIG. 8. It will be apparent that during a reverse bend, the opposing slot surfaces 78, 80 will be urged toward each other. The height of the sidewall 62 and the radius of the bend can be dimensioned without regard to any contact between opposing slot surfaces 78, 80 because the angle α is acute so that the slot surfaces 78, 80 will tend to slip past each other, thereby urging the adjoining segments of the sidewall 62 to slip past each other. This further reduces the possibility of spillage and allows the body portion 52 even more flexibility. To facilitate the slippage during a reverse bend, the angle α may be dimensioned as appropriate for the coefficient of friction for the material comprising the sidewall 62. Generally, the higher the coefficient of friction, the smaller the angle α must be to assure smooth slippage. For example, if the sidewall 66 were made of rubber, the angle α should be smaller than if the material were polyurethane. As well, some friction reducing coating or texture can be applied to the slot surfaces 78, 80 to further minimize friction.

Figure 9:
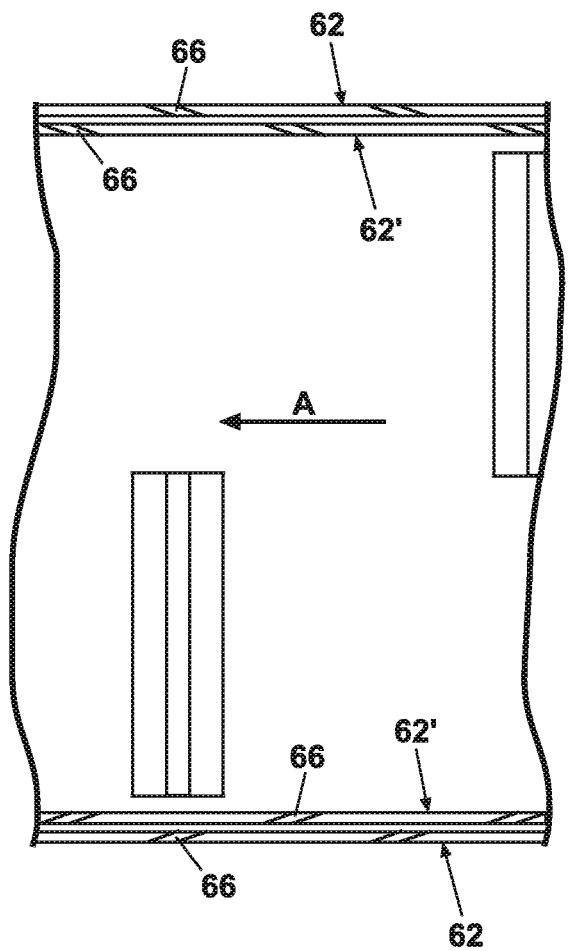
FIG. 9 is a top view of a portion of a second embodiment of an endless belt according to an aspect of the invention.

FIG. 9 shows a second embodiment having a second sidewall 62' which can be disposed immediately adjacent to the sidewall 62, having slots 66 staggered relative to the slots in the sidewall 62 and 62'. So, for example, there can be two adjacent sidewalls 62, 62' on one side of the belt and two adjacent identical sidewalls 62, 62' on the opposite side of the belt as shown in FIG. 9. Such an arrangement provides more strength for the sidewalls. In such an arrangement it would be preferable for each adjacent sidewall to have its slots 66 staggered with the slots on the adjacent sidewall to prevent binding of the sidewalls 62, 62' during a bend or normal movement of the product.

Figure 10A:
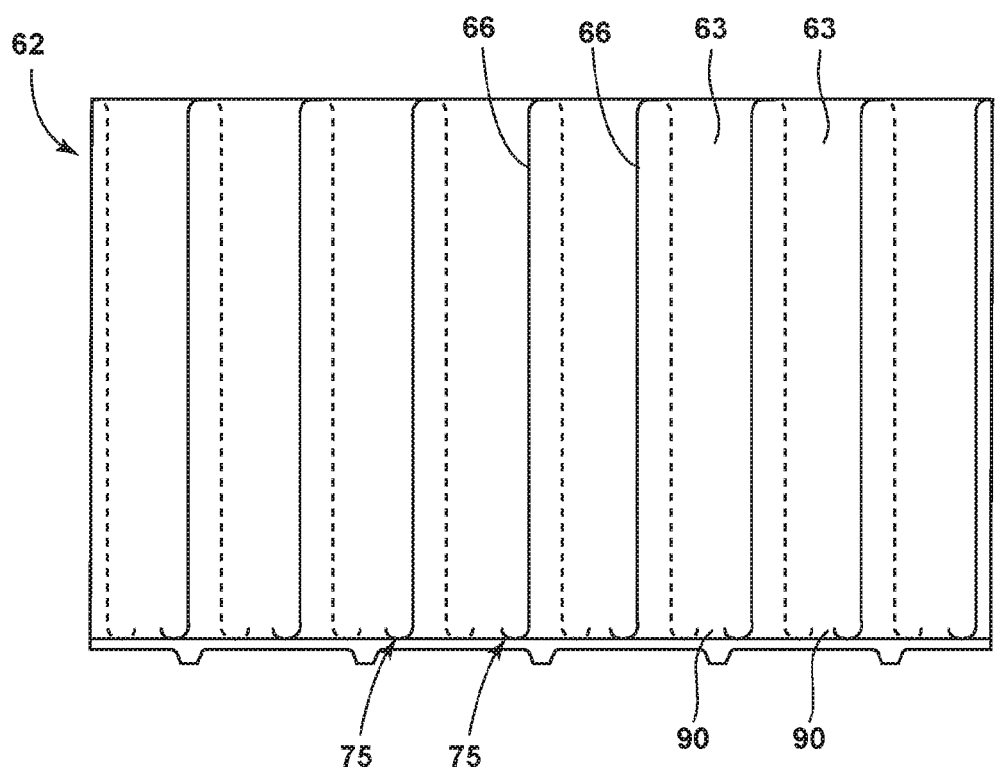
FIG. 10A is a side view of a portion of a third embodiment of an endless belt according to an aspect of the invention.
Figure 10B:
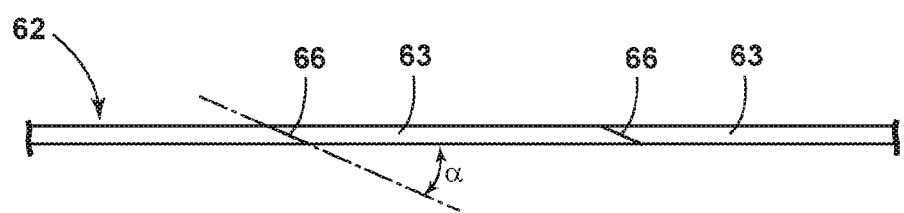
FIG. 10B is a top view of a portion of a third embodiment of an endless belt according to an aspect of the invention.

FIGS. 10a and 10b show a third embodiment with a slot extension such as U-shaped cuts 75 at the base or proximal end of the slots 66 near the load surface 54. Two U-shaped cuts 75 on each sidewall segment 63 leave a neck 90 which is preferably about 7 mm thick attaching the sidewall segment 63 with the load surface 54. Preferably the U-shaped cuts 75 are as close to the load surface 54 as possible to permit sealing the sidewall segment 63 to the load surface 54 without interfering or closing the U-shaped cuts. The U-shaped cuts 75 reduce strain on the sidewalls 62 and allow each segment 63 the ability to twist. The sidewall 62 forms a straight line when the sidewall 62 is not in a bend. The slots 66 are angled longitudinally in the same manner as in FIGS. 5-8 but with little to no kerf. The sidewall 62 in this embodiment is preferably 50 mm or higher in height.

Figure 11:
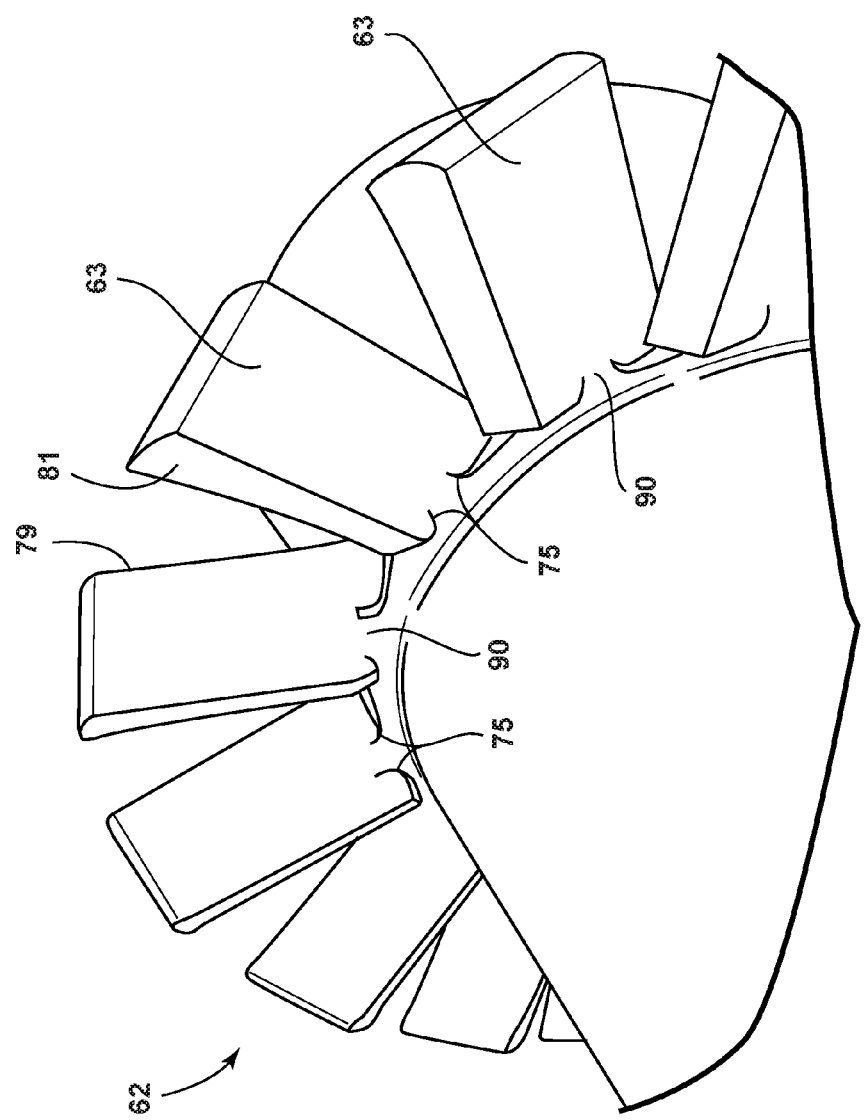
FIG. 11 is a perspective view of a fourth embodiment of an endless belt according to an aspect of the invention in a forward bend.

FIGS. 11-15 show a fourth embodiment of the invention, which is a variation of the third embodiment. FIG. 11 shows the sidewall 62 in a forward bend to illustrate the plurality of sidewall segments 63 which overlap each adjacent sidewall segment 63. The overlap of each segment 63 is such that in a forward bend, the proximal corners remain overlapped in order to prevent the segments 63 from slipping apart from the adjacent segment 63 when in a tight radius bend. Each sidewall segment 63 has an angled slot surface 79 and 81 and will tend to keep each sidewall segment 63 overlapped. Similar to the third embodiment, this embodiment comprises a U-shaped cut 75 on both sides of the base of each slot 66, laterally relative to the direction of travel of the belt. This creates a neck 90 at the proximal end which allows each sidewall segment 63 to twist or rotate further as the conveyer belt bends.

Figure 12:
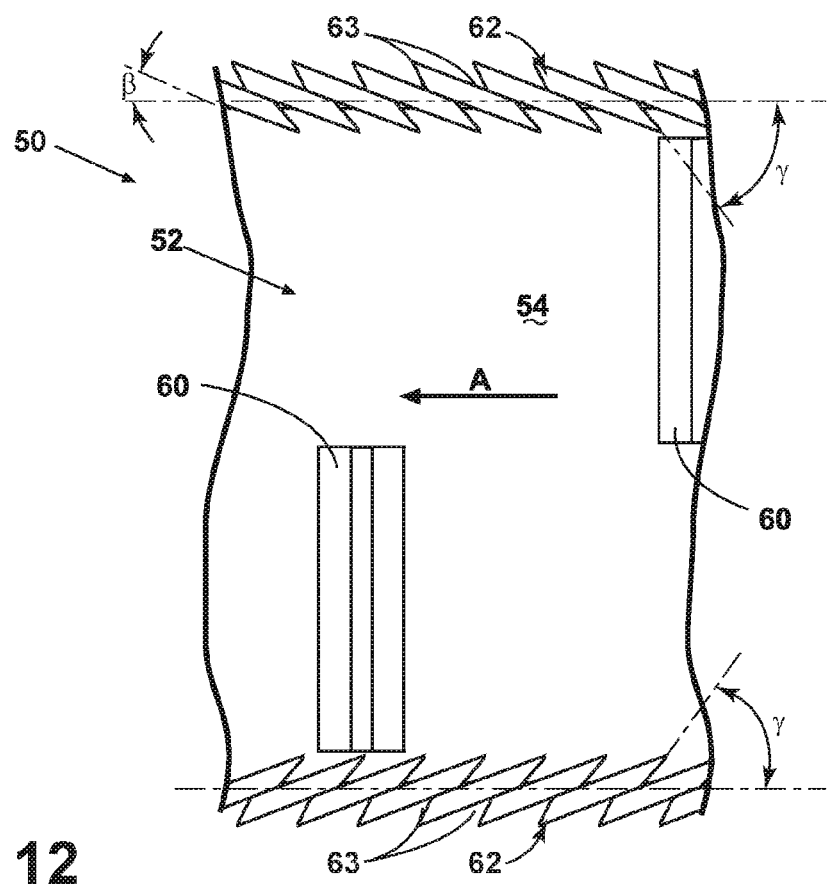
FIG. 12 is a top view of a portion of the fourth embodiment of FIG. 11.
Figures 13, 14:
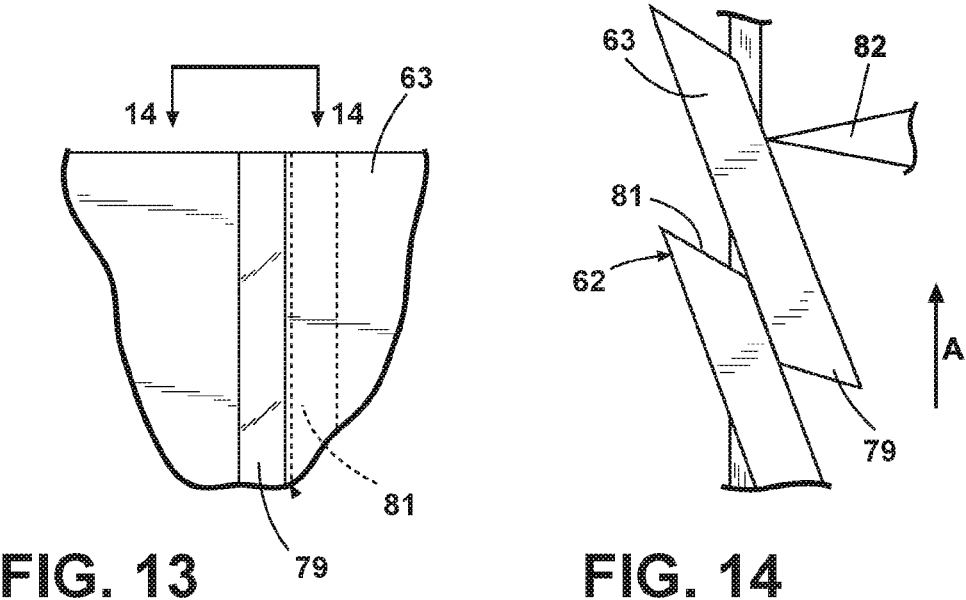
FIG. 13 is an enlarged view of a section of a side view according to the fourth embodiment of FIG. 11.
FIG. 14 is a sectional view taken along line 14-14 of FIG. 13.

As seen in FIG. 12, the slot surfaces 79 and 81 are at an angle γ from the centerline created by the sidewall 62. Each sidewall segment 63 is parallel to the adjacent sidewall segments 63 and are rotated an acute angle β from the centerline formed by the sidewall 62. The angle β is dependent on the thickness and width of the sidewall segments 63, with a thickness preferably between 4 and 7 mm. The width is dependent on the radius of the pulley which the conveyer must bend. The sidewall 62 can be made as one piece, as a co-extrusion with the belt 50, or each sidewall segment 63 can be made separately and attached to the belt 50. If the sidewall segments 63 are made separately, the amount of overlap while the belt 50 is straight can be increased to provide more bend capability and attachment in the field for endless belts should be greatly simplified when the sidewall 62 is made separately from the belt 50. A jig could be created to hold the sidewall segments 63 in their twisted state while a hot air gun or soldering iron wand is used to weld the sidewall segments 63 to the belt 50. Placement should also be greatly simplified (as compared to the corrugated version) by the fact that the base lies in a straight line. When the sidewall 62 is made separately from the load surface 54, it is easier to add cleats to create box effects on the belt and the capacity to adapt to either toothed or flat belts. The sidewall 62 will be preferably made of thermoplastic polyurethane, copolyester, or Pebax™ and attached to the load surface 54 via weld with a technique such as laser welding, or solvent welding, or RF welding, or hot air welding. The thermoplastic polyurethane provides fatigue resistance and thus minimizes crack propagation. The contacting faces of each segment 63 are textured to reduce friction during a bend. The rotated segments 63 have an inherent force that will aide with realignment after a bend and provides lateral stiffness. The overlap of the segments 63 causes a torque to be applied to the load surface 54 when in backbend. The right hand side and left hand side sidewalls 62 will be positioned in opposite directions, as can be seen in FIG. 12, in order to counteract this torque from the opposing side. Transitions under high load tend to cause a bow in the center of the load surface 54. The torque exists in a direction that presses the center of the load surface 54 down, therefore resisting this bowing tendency and ensuring a flat load surface 54.

Figure 15:
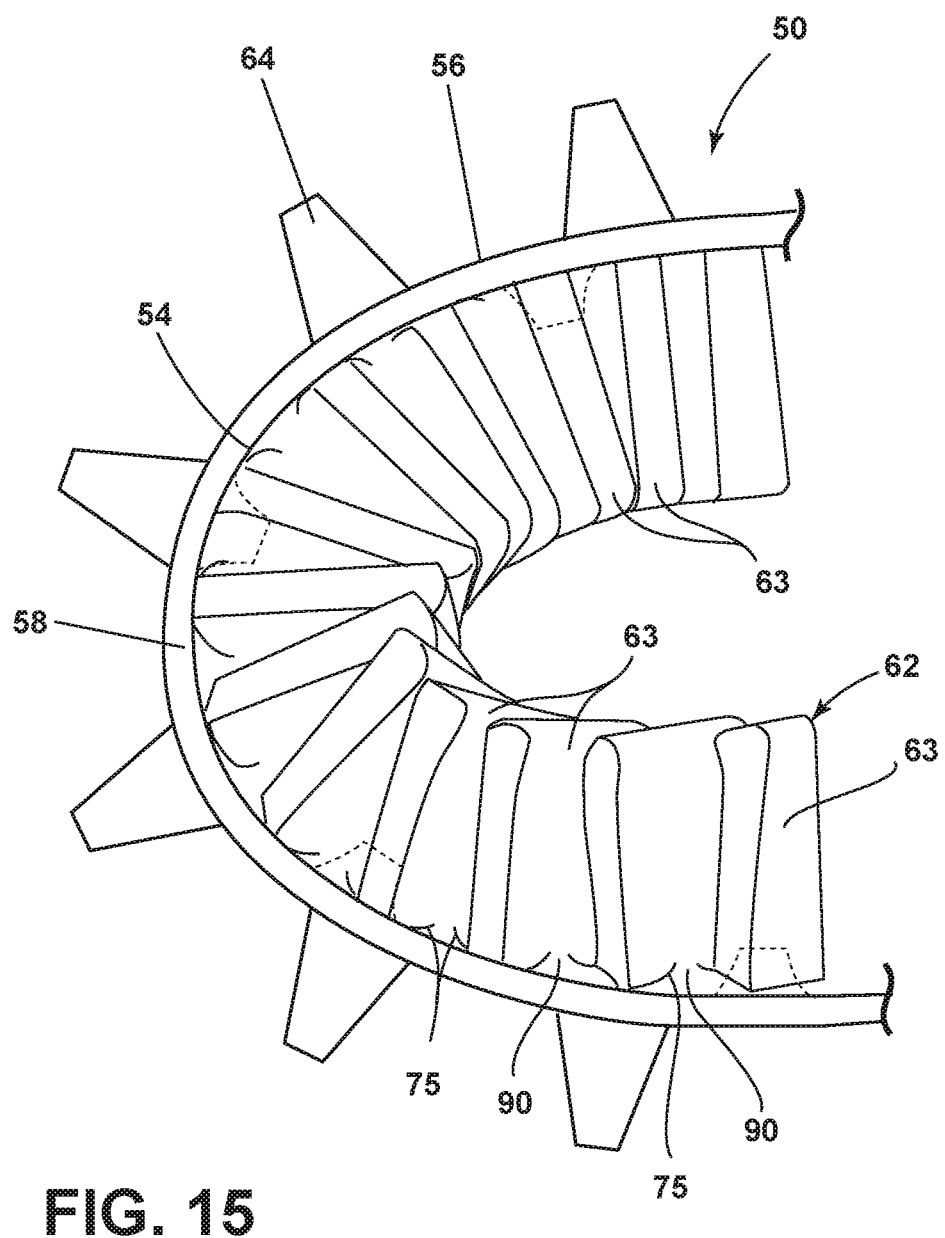
FIG. 15 is a side view of a portion of the endless belt in the embodiment of FIG. 11 engaged in a reverse bend.

FIG. 15 illustrates the sidewall 62 in a reverse bend. It can be seen that a large amount of overlap occurs during a small radius bend. Each sidewall segment 63 overlaps and adjacent sidewall segment 63 during the reverse bend and then slides back to the original, slightly overlapped, position when returned to a straight on the conveyor. Moreover, this flexibility occurs with minimal fatigue on the material of the sidewall segment 63 because of the U-shaped cuts 75.

Figure 16:
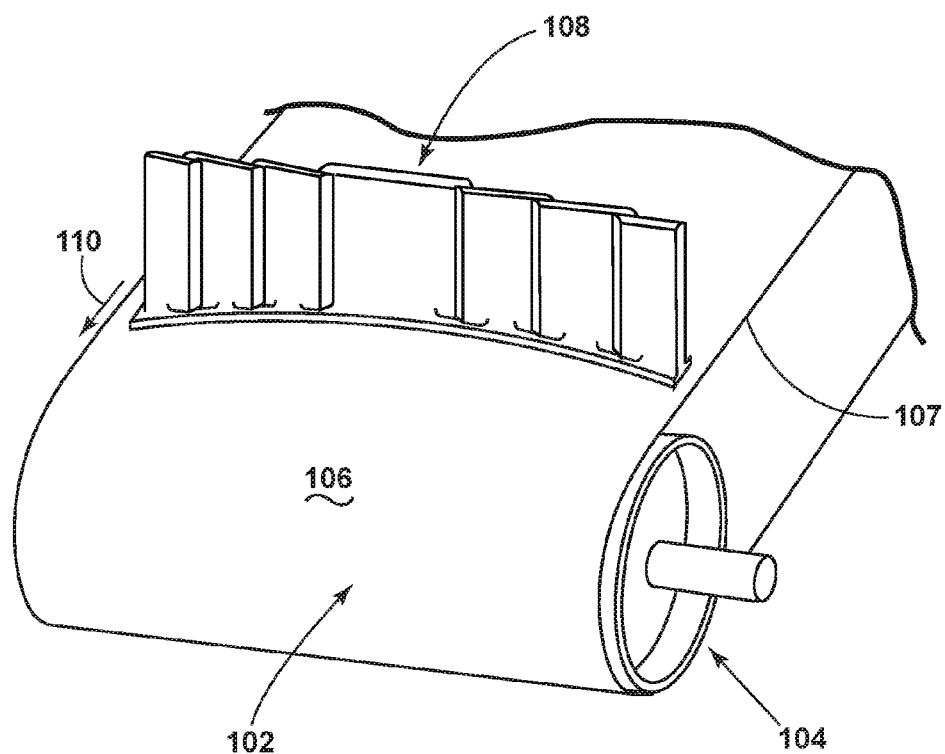
FIG. 16 is an isometric view of an endless belt with a segmented cleat according to an aspect of the invention.

Other embodiments of an aspect of the invention are shown in FIGS. 16-19. FIG. 16 illustrates a body portion 102 of a flat belt wrapping a pulley 104. The body portion 102 includes a load surface 106 and a drive surface 107. The drive surface engages the pulley to be driven thereby. In the case where the drive surface 107 is flat, the body portion 102 will be driven by friction with the pulley 104. In the case where the drive surface 107 has teeth or recesses (not shown), the body portion 102 will be driven by corresponding recesses or teeth (not shown) in the pulley 104. At least one cleat 108 extends from the load surface 106, transversely between edges of the body portion 102. The cleat 108 may extend completely across the load surface 106 or partially across the load surface 106. The cleat 108 is segmented as described above, which means that individual segments can be folded over one another as shown in FIG. 16. The cleat 108 preferably extends away from and normal to the surface 106, thought other angles are within the scope of the disclosure. The cleat 108 may extend transversely nearly straight, or arcuate as shown in FIG. 16. Moreover, it may extend transversely at any angle relative to the direction of travel 110 of the body portion 102, as for example, if product on the load surface 106 is to be directed to a side of the belt. An arcuate cleat 108 may be concave or convex relative to the direction of travel 110.

Figure 17:
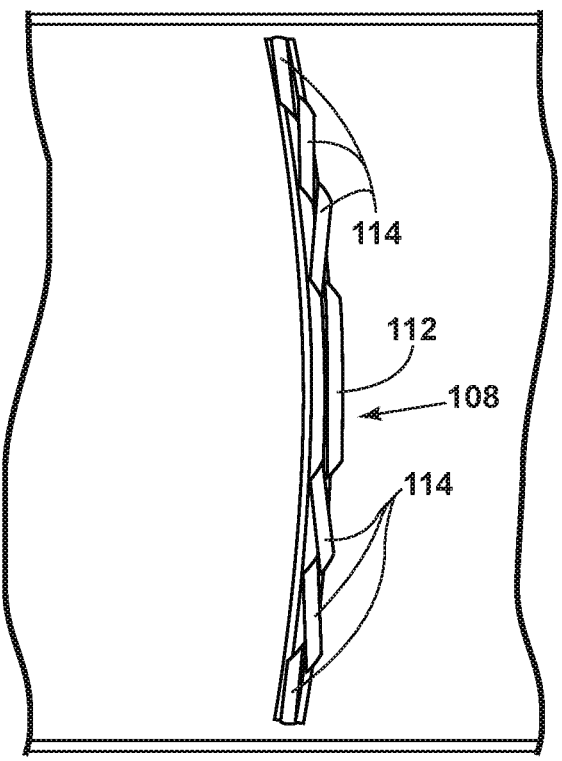
FIG. 17 is a top view of a section of the endless belt of FIG. 16, illustrating a cleat.

FIG. 17 illustrates a top view of a section of the endless belt of FIG. 16, showing the segmented cleat 108 and further illustrating a symmetrically staggered arrangement of individual segments 112, 114. The cleat 108 has a center segment 112, and a plurality of other segments 114 extending laterally from sides of the center segment 112. The individual segments 112, 114 are separated by slots as described above, and may be arranged adjacent each other as described and shown in FIGS. 7-10 (not shown in FIG. 17). Alternatively, they may be successively twisted and folded under neighboring segments as described and shown in FIGS. 11-15 and 17. Some segments may be staggered and some maybe kept unstaggered.

Figure 18:
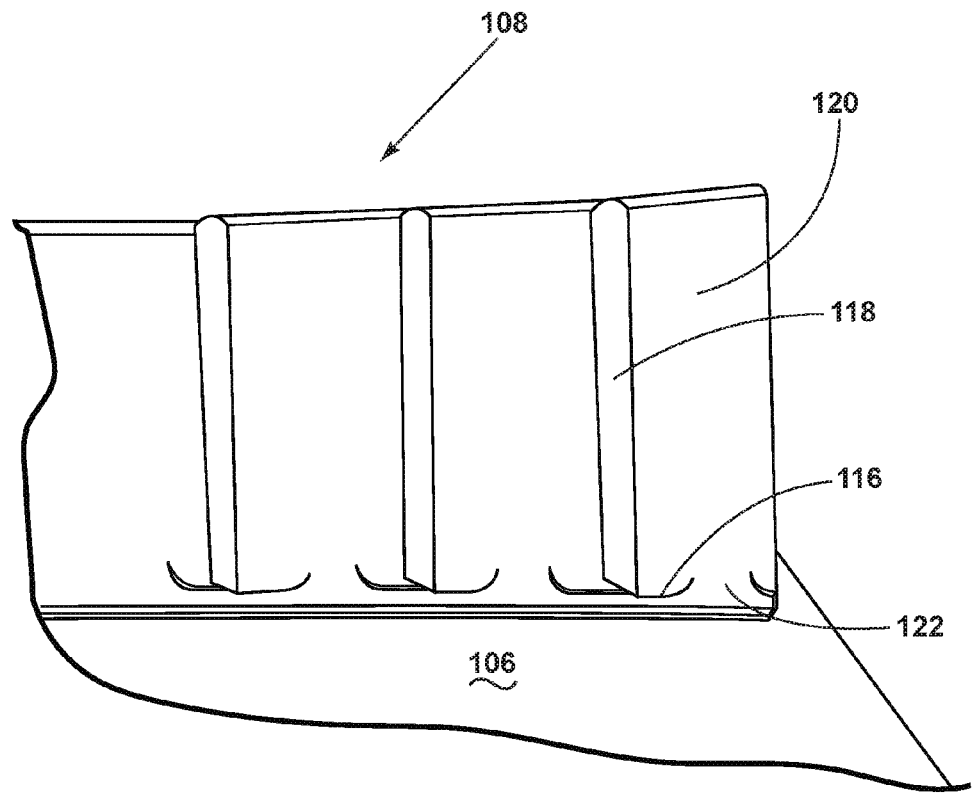
FIG. 18 is a partial isometric view of a cleat according to FIG. 16.
Figure 19:
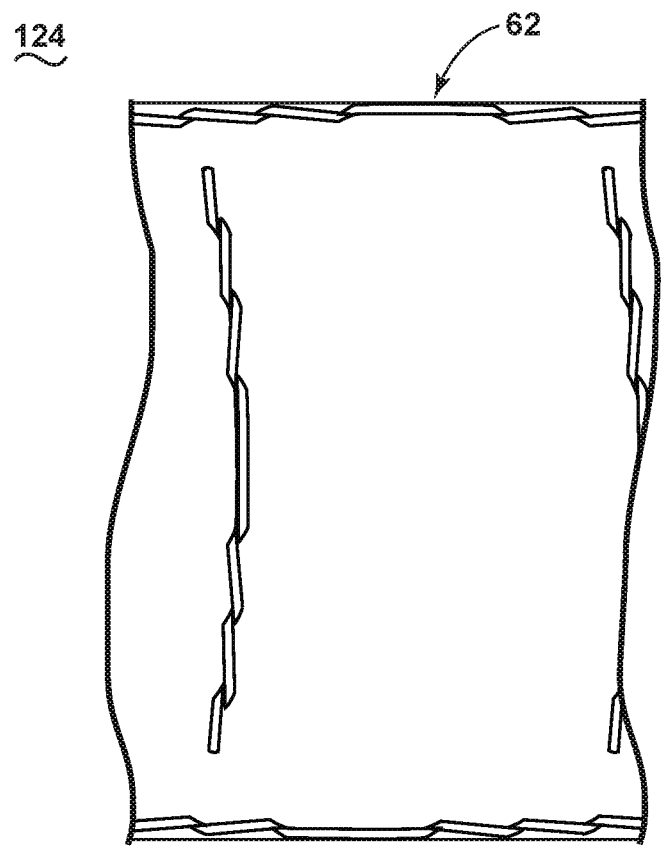
FIG. 19 is a top view of an endless belt with a segmented cleat according to an aspect of the invention, which also illustrates folded segmented sidewalls.

FIG. 18 illustrates a slot extension such as U-shaped cuts 116 at the base or proximal end of the slot surface 118 near the load surface 106. Two U-shaped cuts 116 on each sidewall segment 120 leave a neck 122, attaching the sidewall segment 120 with the load surface 106. The U-shaped cuts 116 reduce strain on the cleat 108 and allow each segment 120 the ability to twist. The cleat 108 forms a straight line or an arc when the sidewall 120 is not in a bend. FIG. 19 illustrates a combination of the two concepts of segmented sidewall 62 and segmented cleat 108 in the same conveyor belt 124.

Although the above description has been made with reference to a direct drive thermoplastic belt, the invention is equally applicable to other types of conveyor belts such as toothed belts and reinforced belts. Generally stated, while the invention has been specifically described in connection with certain specific embodiments thereof, it is to be understood that this is by way of illustration and not of limitation, and the scope of the appended claims should be construed as broadly as the prior art will permit.

What is claimed is:

1. A conveyor belt (50) comprising a body portion (52) having a load surface (54) and a non-corrugated sidewall (62) extending from the load surface (54) of the body portion (52) of the belt and having a longitudinal surface parallel to a direction of travel of the belt, wherein the non-corrugated sidewall has slots (66) extending therethrough at an acute angle relative to the longitudinal surface to facilitate a reverse bend of the body portion (52) about an axis normal to the direction of travel of the belt, each slot extending from a distal edge of the sidewall to a point spaced from a proximal edge of the sidewall at the load surface, and a pair of slot extensions extending in opposite directions from the point to minimize migration of the slot past the point.

2. A conveyor belt according to claim 1 wherein each slot is defined by a leading slot surface and a trailing slot surface, relative to the direction of travel of the belt, and the acute angle is measured between the trailing slot surface and the adjoining longitudinal surface.

3. A conveyor belt according to claim 2 wherein the leading slot surface and the trailing slot surface are separated by a kerf.

4. A conveyor belt according to claim 3 wherein each slot extension is a U-shaped cut.

5. A conveyor belt according to claim 1 further comprising a second non-corrugated sidewall disposed immediately adjacent to the non-corrugated sidewall, having slots staggered relative to the slots in the sidewall.

6. A conveyor belt according to claim 1 wherein the non-corrugated sidewall is thicker at a proximal edge than at a distal edge.

7. A conveyor belt according to claim 6 wherein the non-corrugated sidewall has a foot at the proximal edge.

8. A conveyor belt according to claim 6 wherein the non-corrugated sidewall tapers in thickness from the proximal edge to the distal edge.

9. A conveyor belt according to claim 1 further comprising a hole disposed at the point.

10. A conveyor belt according to claim 9 further comprising a second sidewall disposed immediately adjacent to the non-corrugated sidewall, having slots staggered relative to the slots in the sidewall.

11. A conveyor belt according to claim 1 wherein further comprising means to reduce friction between the leading slot surface and the trailing slot surface.

12. A conveyor belt according to claim 11 wherein the means comprises a smaller acute angle.

13. A conveyor belt according to claim 12 wherein the means comprises a lower coefficient of friction at the leading slot surface and the trailing slot surface.

14. A conveyor belt comprising a body portion having a load surface and a cleat extending from the load surface of the body portion of the belt transverse to a direction of travel of the belt, wherein the cleat has slots extending therethrough at an acute angle relative to a surface of the cleat to facilitate a bend of the body portion about an axis parallel to the direction of travel of the belt, each slot extending from a distal edge of the cleat to a point spaced from a proximal edge of the cleat at the load surface, and a pair of slot extensions extending in opposite directions from the point to minimize migration of the slot past the point.

15. A conveyor belt according to claim 14 wherein each slot extension is a U-shaped cut.

16. A conveyor belt according to claim 15 further comprising a hole at the point.

17. A conveyor belt according to claim 14 further comprising a foot at the proximal edge.

18. A conveyor belt according to claim 14 wherein segments defined by the slots are twisted relative to each other.

19. A conveyor belt according to claim 18 further comprising means to reduce friction between adjacent segments.

20. A conveyor belt according to claim 15 wherein the cleat is arcuate.

* * * * *